United States Patent [19]
Geier et al.

[11] 3,866,982
[45] Feb. 18, 1975

[54] FAILSAFE ANTISKID CONTROL FOR FLUID PRESSURE BRAKE SYSTEM

[75] Inventors: Georg Geier, Hannover; Alfred Klatt, Ronnenberg, both of Germany

[73] Assignee: Wabco Westinghouse GmbH, Hannover, Germany

[22] Filed: Mar. 27, 1974

[21] Appl. No.: 455,248

[30] Foreign Application Priority Data
June 18, 1973 Germany............................ 2331003

[52] U.S. Cl. ............................. 303/21 F, 303/21 AF
[51] Int. Cl.................................................. B60t 8/02
[58] Field of Search.......... 303/21 F, 21 FM, 21 FS, 303/21 AF, 21 LE, 21 CF, 21 CG; 340/52 R, 52 B; 188/181 A, 181 R

[56] References Cited
UNITED STATES PATENTS
3,674,317  7/1972  Mangold..................... 303/21 AF X
3,754,794  8/1973  Durand............................ 303/21 FS
3,820,857  6/1974  Schnaibel et al. ........... 303/21 AF X Primary Examiner—Duane A. Reger
Attorney, Agent, or Firm—R. W. McIntire, Jr.

[57] ABSTRACT

A means for operating an inlet modulator valve in an antiskid brake control system via either its normal energizing circuit or via a diode in a parallel circuit that is energized when an outlet modulator valve is operated during a cycle of wheel skid control. This assures operation of the inlet modulator any time the outlet modulator is operated so that inadvertent supply of brake pressure via the inlet modulator is prevented when a malfunction renders the inlet modulator inoperative via its normal energizing circuit at the time the outlet modulator is venting brake pressure, thus safeguarding the system against depletion of supply pressure and consequent loss of braking ability following completion of the wheel skid control cycle.

5 Claims, 1 Drawing Figure

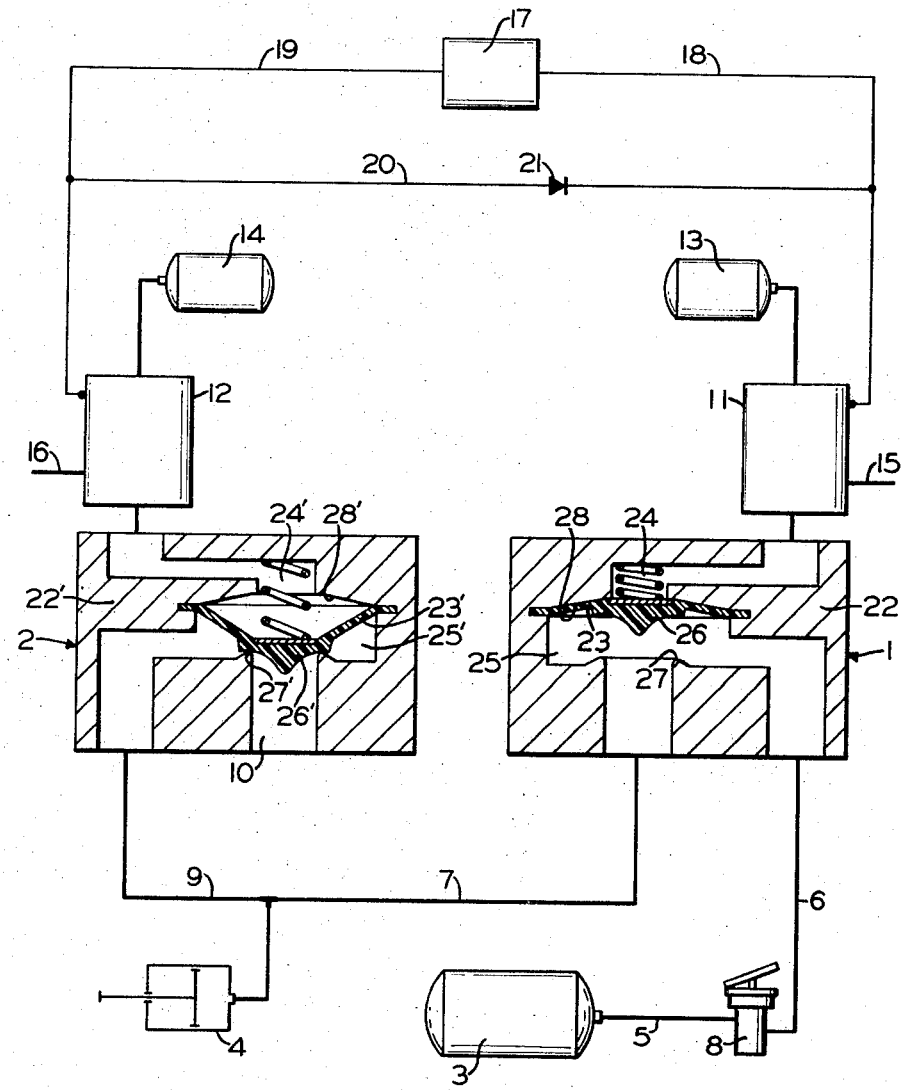

FAILSAFE ANTISKID CONTROL FOR FLUID PRESSURE BRAKE SYSTEM

BACKGROUND OF THE INVENTION

The present invention is concerned with an antiskid brake control system of the fluid pressure type in which separately controlled inlet and outlet modulator valves are inserted in the brake circuit of each wheel for the purpose of effecting an adjustment of the wheel brake pressure according to wheel monitoring means whose output signals continuously reflect the dynamic behavior of the vehicle wheel.

Normally the inlet modulator valve is open to admit the supply of fluid pressure to the brake circuit which is concurrently closed to atmosphere by the outlet modulator valve so that control of brake pressure is under the influence of the operator, except when a wheel skid is imminent. In such event, as indicated by a wheel of the vehicle exceeding a predetermined deceleration threshold, the monitoring means operates to emit output signals to solenoid valves which actuate the respective inlet and outlet modulator valves. The supply of fluid pressure to the braking circuit via the inlet valve is then interrupted while concurrently the outlet valve opens the brake circuit to atmosphere to effect a reduction of brake pressure in order to allow the wheel to regain normal rotation.

In the event an output signal from the monitoring means should fail to materialize at the solenoid of the inlet modulating valve, due to a broken wire or a malfunction of the monitoring means, for example, the inlet valve will remain in its normal unactuated position thereby remaining open to continue admitting supply pressure to the braking circuit. Since the outlet valve is concurrently open to atmosphere, a situation would therefore arise in which a direct communication is provided between the source of supply pressure and atmosphere via the open inlet and outlet valves. This results in a rapid depletion of supply pressure to prevent any subsequent reapplication of brake pressure, thus jeopardizing the safety of the vehicle.

SUMMARY OF THE INVENTION

It is therefore the object of the present invention to safeguard the fluid brake system against inadvertent loss of its fluid supply pressure to atmosphere when a malfunction of any sort prevents the inlet modulator valve from receiving a closure signal at the time the outlet modulator valve is operated to relieve brake pressure.

More specifically, it is the object of the invention to subject the inlet modulator valve to the outlet modulator valve control signal in parallel with its own control signal.

Briefly, these objects are accomplished by interconnecting the solenoid energizing circuits of the inlet and outlet modulator valves via a diode. This provides the inlet modulator valve solenoid with a circuit path in parallel with its normal control circuit via which the outlet modulator valve solenoid control signal is able to effect closure of the inlet modulator valve when actuating the outlet modulator valve to exhaust brake pressure. By ensuring interruption of supply pressure to the brake system via the inlet modulator valve at this time, depletion of the supply pressure is prevented when a malfunction prevents the inlet valve from being operated via its normal solenoid control circuit. Whenever the inlet valve alone is operated via its own energizing circuit in the absence of a malfunction, the diode prevents energization of the outlet valve solenoid via the parallel circuit path.

Other objects and advantages will be recognized from the following description when taken with the single FIGURE drawing showing the antiskid brake control system of the invention.

DESCRIPTION AND OPERATION

The system includes inlet and outlet modulator valves 1 and 2. Inlet valve 1 consists of a two-way, normally open poppet valve configuration, while outlet valve 2 is a two-way, normally closed poppet valve configuration. A reservoir 3 suitable for storing a supply of fluid pressure, as from a compressor (not shown), is connected to a fluid pressure operated brake cylinder device 4 via conduits 5, 6 and 7. An operator controlled brake valve device 8 of conventional design is disposed in conduit 5, 6 ahead of inlet valve 1, whose inlet port is connected to conduit 6 and whose outlet port is connected to conduit 7. The inlet port of outlet valve 2 is connected to a conduit 9, which is connected to brake cylinder 4 in parallel with conduit 7. The outlet port 10 of outlet valve 2 is open to atmosphere.

Associated with the respective inlet and outlet valves 1 and 2 is a solenoid operated, fluid pressure pilot valve 11 and 12 capable of effecting switching of their respective inlet and outlet modulator valves. Connected to the inlet of the respective pilot valves 11 and 12 is fluid pressure from a storage reservoir 13 and 14, which may be charged from the compressed air supply provided by the system compressor (not shown). An exhaust port 15 of pilot valve 11 and exhaust port 16 of pilot valve 12 are provided for venting the respective pilot valve outlets to atmosphere. The pilot valve solenoids are each connected to a wheel monitoring device 17 via respective wires 18 and 19 for controlling operation of the inlet and outlet modulator valves in accordance with signals emitted by monitoring device 17 in response to certain values of wheel deceleration and acceleration having been exceeded, as is well known in the art.

Wires 18 and 19 are interconnected via a wire 20, in which a diode 21 is located to pass current to the solenoid of inlet valve 1 in a direction from wire 19 to wire 18 and to block current flow in the opposite direction.

Inlet valve 1 is comprised of a body 22 in which a diaphragm 23 of a resilient, elastic material, such as plastic or the like, is carried. Diaphragm 23 cooperates with body 22 in forming a control chamber 24 and a pressure chamber 25. Formed integral with diaphragm 23 is a projection 26 which cooperates with an annular seat 27 to provide the poppet valve action for opening and closing pressure chamber 25 with respect to the supply of fluid pressure stored in reservoir 3 and controlled by brake valve 8. Due to the elastic nature of diaphragm 23, a built-in tension or bias is obtained which normally maintains diaphragm 23 against a conical stop surface 28 of body 22. In this position, projection 26 is retracted from seat 27 to establish the normally open condition of inlet valve 1, hereinbefore mentioned.

Outlet valve 2 is of similar construction as inlet valve 1 and accordingly carries identical reference numerals with a prime mark to identify corresponding parts.

Prior to an impending wheel skid condition, the shown normally open condition of inlet valve 1 and normally closed condition of outlet valve 2 prevails, since monitoring device 17 does not emit a signal via either wire 18 or 19. Accordingly, the solenoids of pilot valves 11 and 12 are each deenergized. In this deenergized condition of the respective solenoids, pilot valve 11 establishes atmospheric communication with the inlet valve control chamber 24, thereby allowing the self-biasing effect of diaphragm 23 to effect unseating of projection 26 from seat 27. On the other hand, pilot valve 16 establishes fluid pressure communication between reservoir 14 and control chamber 24' of outlet valve 2 to force projection 26' of diaphragm 23 into engagement with seat 27' in opposition to the built-in diaphragm tension. In this manner, the hereinbefore mentioned normally open condition of inlet valve 1 and normally closed condition of outlet valve 2 is established.

Operation of brake valve 8, while inlet and outlet modulating valves 1 and 2 are in their normally open and closed condition, respectively, results in the buildup of fluid pressure in brake cylinder 4 from reservoir 3 via conduits 5, 6 and 7. Although not shown, it is to be understood that a similar brake system for each additional vehicle wheel may be provided so as to also be normally controlled in parallel with the system shown when brake valve 8 is so operated.

Should the wheel deceleration exceed a preselected deceleration threshold during this brake application period due to the wheel/road adhesion being insufficient to support such brake effort without skidding the vehicle wheel, monitoring device 17 will emit an output signal via each wire 18 and 19. In the event, wire 18 fails to become energized due to some malfunction of monitoring device 17 or a broken wire 18, for example, the solenoid of pilot valve 11 will be automatically energized via wire 19, wire 20 and diode 21, while the solenoid of pilot valve 12 is concurrently energized via wire 19. Accordingly, control chamber 24 of inlet valve 1 is supplied with fluid pressure stored in reservoir 13, while control chamber 24' of outlet valve 2 is vented to atmosphere via exhaust port 16 of pilot valve 12.

The admission of fluid pressure to chamber 24 of inlet valve 1 subjects diaphragm 23 to a force sufficient to overcome its internal bias and thus force projection 26 to engage its seat 27.

At the same time, venting of control chamber 24' of outlet valve 2 allows diaphragm 23', by reason of its internal tension, to lift off seat 27'.

This switching of inlet valve 1 to its closed position and outlet valve 2 to its open position interrupts any further supply of fluid pressure from reservoir 3 to brake cylinder 4 via conduits 5, 6 and 7, while at the same time connecting the existing brake cylinder pressure to atmosphere via conduit 9 and outlet port 10 of valve 2. This results in a rapid drop in brake pressure until normal wheel rotation is restored, i.e., until the wheel deceleration falls below the deceleration threshold.

It is appreciated therefore that in utilizing the means described for effecting closure of inlet valve 1 at the time outlet valve 2 is opened, the unintentional loss of supply pressure from reservoir 3 is prevented, irrespective of the fact that failure of an output signal to arise at wire 18 may occur, such failure otherwise resulting in rapid depletion of the supply pressure and the inability therefore to obtain a subsequent reapplication of braking.

Assuming now that monitoring device 17 removes the signal from wire 19 in accordance with the wheel deceleration dropping below the skid threshold, outlet valve 2 will be restored to its normally closed condition, terminating any further dumping of brake pressure. Under normal conditions, monitoring device 17 would maintain wire 18 energized to prevent a reapplication of brake pressure while the wheel was accelerating to normal rotation. Since wire 18 is assumed to be deenergized, however, due to a malfunction, the solenoid of pilot valve 11 will become deenergized concurrent with deenergization of the solenoid of pilot valve 12 when wire 19 becomes deenergized. Accordingly, inlet valve 1 will be switched to its normally open condition to effect a reapplication of brake pressure simultaneously with closure of outlet valve 2, as above described. While this somewhat premature reapplication of brake pressure may induce a greater number of wheel skid correction cycles, for reasons well known, any excessive cycling during a malfunction becomes inconsequential in light of the benefits gained in protecting against complete brake failure.

Having now described the invention what we claim as new and desire to secure by letters Patent, is:

1. A vehicle antiskid brake control system of the type having wheel monitoring means for producing output signals according to the dynamic behavior of the wheel, a first one of said output signals being connectable with an inlet modulator valve and a second one of said output signals being conectable with an outlet modulator valve to control operation thereof for effecting adjustment of the wheel brake pressure during a cycle of wheel skid control, wherein the improvement comprises means for connecting said second output signal to said inlet valve in parallel with said first output signal to effect operation of said inlet valve when said outlet valve is operated in the absence of said first output signal.

2. The system as recited in claim 1, further characterized in that said first and second output signals have an electrical characteristic and said inlet and outlet valves are electrically controlled in accordance with said first and second output signals, respectively.

3. The system as recited in claim 2, further characterized in that said means for connecting said second output signal to said inlet valve includes a diode to prevent said first output signal from being connected to said outlet valve.

4. The system as recited in claim 2, further comprising:
   a. a source of fluid pressure;
   b. a fluid pressure operated brake cylinder device;
   c. valve means for controlling the supply of fluid pressure from said source to said brake cylinder device to provide said wheel brake pressure; and
   d. said inlet valve being normally open to admit fluid brake pressure provided by said valve means to said brake cylinder device and said outlet valve being normally closed to interrupt atmospheric communication with said brake cylinder device, said inlet valve interrupting admission of fluid brake pressure from said valve means and said outlet valve establishing said atmospheric communication to vent said wheel brake pressure when each of said inlet and outlet valves is operated responsive to said second output signal.

5. The system as recited in claim 4, further characterized in that said inlet and outlet valves are switched from a deenergized condition to an energized condition responsive to said second output signal being provided to effect said operation thereof.

* * * * *